United States Patent Office 3,758,362
Patented Sept. 11, 1973

3,758,362
DUAL LATEX ADHESIVE SYSTEM
Martin L. Brown, Elkton, Md., assignor to E. I. du Pont de Nemours and Company, Wilmington, Del.
No Drawing. Filed Mar. 26, 1971, Ser. No. 128,557
Int. Cl. B32b 7/00, 7/04
U.S. Cl. 156—310        7 Claims

ABSTRACT OF THE DISCLOSURE

Rapid bonding of substrates is accomplished by (a) coating a surface of a substrate with an anionic elastomeric latex and coating a surface of a second substrate with a cationic elastomeric latex, (b) contacting the coated surfaces of the substrates while the latex coatings remain uncoagulated, and (c) maintaining contact between the coated surfaces until coagulation of both latex layers occurs.

BACKGROUND OF THE INVENTION

This invention relates to a process for rapid bonding of substrates by means of dual latex adhesive systems.

It is well known to use a variety of polymers as bases for adhesive compositions which may be in either a latex, i.e., aqueous dispersion of polymer, or an organic solvent lacquer form (a contact bonding solvent cement). However, adhesive systems of these types known in the prior art are not entirely satisfactory in that (1) contact bonding solvent cements generally have the disadvantage of requiring that the coated surfaces not be joined until sufficient time has elapsed to allow the solvent in the cement to evaporate (furthermore, once the coated surfaces are contacted they cannot be readily repositioned when a contact bonding solvent cement has been used) and (2) single latex cements are generally slow in forming usable bond strengths.

THE INVENTION

In accordance with this invention there is provided a novel process for the rapid bonding of substrates by (1) coating a surface of a substrate with an anionic elastomeric latex and coating a surface of a second substrate with a cationic elastomeric latex, (2) contacting the coated surfaces of the substrates while the latex coatings are uncoagulated, and (3) maintaining contact between the coated surfaces until coagulation of both the latex layers occurs.

The term "latex" as used herein refers to aqueous emulsions of polymer containing conventional latex additives such as emulsifiers, and surfactants (anionic latexes containing anionic emulsifiers and anionic or nonionic surfactants, cationic latexes containing cationic emulsifiers and cationic or nonionic surfactants).

Any elastomeric latex is useful in the process of this invention. Conventional elastomeric latexes containing about 20–60% by weight solids content are conveniently employed and those containing about 50–60% solids content are preferred.

Elastomeric Neoprene (Neoprene is the trade name for polymers and copolymers of chloroprene, i.e., 2-chloro-1,3-butadiene) latexes are particularly useful in this invention. Any of the Neoprene latexes known in the art can be used in the present invention and a variety of such useful latexes are described in Neoprene Latex, John C. Carl (1962), U.S. Library of Congress Catalog Card #62,535–500. Other Neoprene latexes useful in this invention are described in U.S. Pat. 3,082,262 to Scott and U.S. Pat. 2,494,087 to Daniels. Particularly preferred are Neoprene latexes containing about 50–60% by weight solids content such as are described hereinafter in the examples.

Other anionic and cationic elastomeric latexes which are useful in the process of this invention include latexes of butadiene/styrene polymers, butadiene/nitrile polymers, polyvinylidene chloride, acrylic polymers, polyvinyl acetate, and ethylene/vinyl acetate copolymers.

Elastomeric latex blends are also useful. Such blends include polychloroprene/styrene-butadiene copolymer, polychloroprene / polyvinylidene chloride, polychloroprene/natural rubber, and polychloroprene/nitrile-butadiene copolymer.

Resins may be added to the latexes in order to enhance their adhesive properties.

The process of this invention is useful for bonding a wide variety of substrates, and is particularly useful for bonding porous substrates to each other or to non-porous substrates. Typical porous substrates include wood, paper, cardboard, cloth, and gypsum board. Typical non-porous substrates include metals such as steel, and aluminum and plastics such as high pressure laminates of the phenolic resin type.

The coating of the substrates to be bonded is accomplished in accordance with generally used methods for applying adhesives and cements such as dipping, painting, spraying, roller-coating, knife-coating, etc. The coated substrate surfaces can be brought into superposed contact immediately after coating but this is not necessary and the substrates can be brought into contact at any time prior to the coagulation of the latex coatings. Generally coagulation will occur about twenty minutes after coating at room temperature. Pressure may, of course, be applied to the contacted substrates in order to facilitate bonding, although this is not required in order to obtain the advantages of the invention. Preferably slight finger pressure or the equivalent thereof is applied to the contacted substrates.

The following example illustrates the invention. All parts, percentages and proportions are by weight unless otherwise indicated.

EXAMPLES

Compounded latexes are prepared as follows:

Anionic Latex A

To 200 parts of Neoprene Latex 572 (a commercially available 50% solids, high gel polychloroprene anionic latex having an initial pH of 12, a specific gravity of 1.11, and a Brookfield viscosity of 23 cps. wherein the emulsifying agent is sodium rosinate) is added to 5 parts of zinc oxide (10 parts of 50% dispersion in water containing sodium rosinate as an emulsifying agent), 2 parts of 2,2'-methylene-bis(4-methyl-6-tert-butyl-phenol) as an antioxidant (6 parts of 33% dispersion in water containing sodium rosinate as an emulsifying agent) and 35 parts of a resin ester resin (70 parts of 50% dispersion of resin in water containing sodium rosinate as an emulsifying agent).

Anionic Latex B

The same amounts of zinc oxide, antioxidant and rosin ester resin as in Latex A are added to 172 parts of Neoprene Latex 635 (a commercially available 58% solids, sol polychloroprene anionic latex having an initial pH of 11, a specific gravity of 1.12; and a Brookfield viscosity of 350 cps. wherein the emulsifying agent is the sodium salt of disproportionated rosin).

Anionic Latex C

The same amounts of zinc oxide, antioxidant, and rosin ester resin as in Latex A are added to 200 parts of Neoprene Latex 750 (a commercially available 50% solids, medium gel polychloroprene anionic latex having an initial pH of 12.5, a specific gravity of 1.10 and a Brookfield viscosity of 13 cps. wherein the emulsifying agent is the potassium salt of disproportionated rosin).

Anionic Latex D

The same amounts of zinc oxide, antioxidant, and rosin ester resin as in Latex A are added to 200 parts of Neoprene Latex 400 (a commercially available 50% solids, medium gel anionic latex of a copolymer of chloroprene and 2,3-dichloro-1,3-butadiene, the latex having an initial pH of 12.5, a specific gravity of 1.15 and a Brookfield viscosity of 15 cps. wherein the emulsifying agent is the potassium salt of disproportionated rosin).

Anionic Latex E

The same as Latex A except the rosin ester is omitted.

Anionic Latex F

The same as Latex B except the rosin ester is omitted.

Anionic Latex G

The same as Latex C except the rosin ester is omitted.

Anionic Latex H

The same as Latex D except the rosin ester is omitted.

Cationic Latex I

To 200 parts of Neoprene Latex 950 (a commercially available 50% solids, high gel polychloroprene cationic latex having an initial pH of 9, a specific gravity of 1.10 and a Brookfield viscosity of 17 cps. wherein the emulsifying agent is alkylated tolyl methyl trimethyl ammonium chloride) is added 5 parts of zinc oxide (10 parts of a 55% dispersion in water containing alkylated tolyl methyl trimethyl ammonium chloride as an emulsifying agent) and 2 parts 2,2'-methylene-bis(4-methyl-6-tert-butylphenol) as an antioxidant (6 parts of a 33% dispersion in water containing alkylated tolyl methyl trimethyl ammonium chloride as an emulsifying agent).

Lap shear specimens were prepared by brush coating latex on a 1" x 3" piece of AA Douglas fir plywood and a second latex on a second piece of plywood. The plywood samples were overlapped one inch, pressed together with finger pressure and tested for shear strength according the ASTM D-816, Method B. Shear strengths obtained after various time periods are shown in the table. Examples 1-8 in the table illustrate the invention and Examples 9-11 illustrate prior art adhesive systems. It can be seen from the results given in the table that a bond of considerable strength is formed rapidly when an anionic latex is brought into contact with a cationic latex and that such bonds are superior to bonds formed by single latex systems (Examples 9 and 10) or by solvent systems (Example 11) under the name conditions.

TABLE

| Example | Latex on Side 1 | Latex on Side 2 | Shear strength (lbs.) after— | | | | |
|---|---|---|---|---|---|---|---|
| | | | 15 sec. | 30 sec. | 1 min. | 5 min. | 1 hr. |
| 1 | A | I | 9 | 10 | 12 | 14 | 40 |
| 2 | B | I | 4 | 1.3 | 6 | 16 | 56 |
| 3 | C | I | 6 | 8 | 4 | 18 | 98 |
| 4 | D | I | 8 | 6 | 2 | 20 | 50 |
| 5 | E | I | 8 | 7 | 8 | 10 | 73 |
| 6 | F | I | 12 | 0.6 | 6 | 9 | 77 |
| 7 | G | I | 6 | 2 | 2 | 9 | 40 |
| 8 | H | I | 1 | 7 | 10 | 14 | 103 |
| 9 | A | A | 0.25 | 0.5 | 0.5 | 7 | 35 |
| 10 | C | C | 0 | 0 | 0 | 0.5 | 64 |
| 11 | (¹) | | 0.25 | 0.25 | 0.25 | 0.25 | 6 |

¹ Solvent mastic.

What is claimed is:
1. A process for the rapid bonding of substrates which consist essentially of
   (A) coating a surface of a porous substrate with an anionic elastomeric latex containing polychloroprene and coating a surface of a second porous substrate with a cationic elastomeric latex containing polychloroprene, said latexes having a solids content of about 20–60% by weight,
   (B) contacting the coated surfaces of the substrates while the latex coatings remain uncoagulated, and
   (C) maintaining contact between the coated surfaces until coagulation of both latex layers occurs.
2. The process of claim 1 wherein the latexes have about 50–60% by weight solids content.
3. The process of claim 1 wherein both latexes are of polychloroprene.
4. The process of claim 1 wherein the anionic latexes are (a) a latex which contains about 50% solids and which is a high gel polychloroprene latex having an initial pH of 12, a specific gravity of 1.11 and a Brookfield viscosity of 23 cps. wherein the emulsifying agent is sodium rosinate; (b) a latex which contains about 58% solids and which is a sol latex having an initial pH of 11, a specific gravity of 1.12, a Brookfield viscosity of 350 cps. wherein the emulsifying agent is the sodium salt of disproportionated rosin; (c) a latex which contains 50% solids and which is a medium gel latex having an initial pH of 12.5, a specific gravity of 1.10 and a Brookfield viscosity of 13 cps. wherein the emulsifying agent is the potassium salt of disproportionated rosin, or (d) a latex which contains 50% solids and which is a medium gel latex of a copolymer of chloroprene and 2,3-dichlorobutadiene having an initial pH of 12.5, a specific gravity of 1.15 and a Brookfield viscosity of 15 cps. wherein the emulsifying agent is the potassium salt of disproportionated rosin and wherein the cationic latex is a 50% solids high gel latex having an initial pH of 9, a specific gravity of 1.10 and a Brookfield viscosity of 17 cps. wherein the emulsifying agent is alkylated tolyl methyl trimethyl ammonium chloride.
5. The process of claim 4 wherein the anionic latex contains about 35 parts of rosin ester resin per 200 parts latex.
6. The process of claim 1 wherein the substrates are wood.
7. The process of claim 1 wherein one substrate is wood and the second is gypsum board.

References Cited
UNITED STATES PATENTS
2,557,826  6/1951  Keaton et al. _____ 156—310

FOREIGN PATENTS
1,354,366  1/1964  France.

GEORGE F. LESMES, Primary Examiner

P. J. THIBODEAU, Assistant Examiner

U.S. Cl. X.R.
156—325, 333, 334; 161—188